C. F. PYM.
LASTING MACHINE.
APPLICATION FILED SEPT. 23, 1908.

938,513.

Patented Nov. 2, 1909.
8 SHEETS—SHEET 1.

Fig. 1.

WITNESSES:
Anna M. Dorr
Anna M. Mayer

INVENTOR
Charles F. Pym
BY
ATTORNEYS

C. F. PYM.
LASTING MACHINE.
APPLICATION FILED SEPT. 23, 1908.

938,513.

Patented Nov. 2, 1909.
8 SHEETS—SHEET 2.

WITNESSES:

INVENTOR
Charles F. Pym
BY

ATTORNEYS

C. F. PYM.
LASTING MACHINE.
APPLICATION FILED SEPT. 23, 1908.

938,513.

Patented Nov. 2, 1909.
8 SHEETS—SHEET 5.

WITNESSES:
Anna M. Dow.
Anna M. Mayer.

INVENTOR
Charles F. Pym
BY
ATTORNEYS

C. F. PYM.
LASTING MACHINE.
APPLICATION FILED SEPT. 23, 1908.

938,513.

Patented Nov. 2, 1909.
8 SHEETS—SHEET 6.

WITNESSES:
Anna M. Doris
Anna M. Mayer

INVENTOR
Charles F. Pym
BY
ATTORNEYS

C. F. PYM.
LASTING MACHINE.
APPLICATION FILED SEPT. 23, 1908.

938,513.

Patented Nov. 2, 1909.
8 SHEETS—SHEET 7.

WITNESSES:
Anna M. Dorr.
Anna M. Mayer.

INVENTOR
Charles F. Pym
BY
ATTORNEYS

C. F. PYM.
LASTING MACHINE.
APPLICATION FILED SEPT. 23, 1908.

938,513.

Patented Nov. 2, 1909.
8 SHEETS—SHEET 8.

WITNESSES:
Anna M. Dorr
Anna M. Mayer

INVENTOR
Charles F. Pym
BY
ATTORNEYS

UNITED STATES PATENT OFFICE.

CHARLES F. PYM, OF ESSEX, ONTARIO, CANADA, ASSIGNOR OF ONE-HALF TO KRENTLER BROTHERS CO., OF DETROIT, MICHIGAN, A CORPORATION OF MICHIGAN.

LASTING-MACHINE.

938,513.  Specification of Letters Patent.  Patented Nov. 2, 1909.

Application filed September 23, 1908. Serial No. 454,403.

*To all whom it may concern:*

Be it known that I, CHARLES F. PYM, subject of the King of Great Britain, residing at Essex, in the county of Essex and Province of Ontario, Dominion of Canada, have invented certain new and useful Improvements in Lasting-Machines, of which the following is a specification, reference being had therein to the accompanying drawings.

This invention relates to improvements in lasting machines and more particularly to that class of lasting machines of which Letters Patent numbered 882,018 issued to me March 17, 1908, is an example.

The object of this invention is to perfect, simplify and cheapen the construction of such machines, and to provide certain new and useful features, all as hereinafter more fully described, reference being had to the accompanying drawings in which—

Fig. 14 is a plan view of the machine.

As shown in the drawings, 1 is a suitable pedestal provided with a head having a table 2 upon which are secured brackets 3 near its rear edge, each formed with two bearings, one for a drive shaft 4 and the other for a countershaft 5. Motion is transmitted from the driving shaft to the driven or countershaft by means of a pinion 6 on the former shaft in mesh with a gear 7 on the latter, which pinion and gear are in the proportion of three to one so that one revolution of the driving shaft will turn the countershaft but one-third of a revolution. A suitable belt pulley 8 is mounted loosely upon the end of the driving shaft and provided with any well known form of roller clutch located in its hub casing 9. A wheel 10 secured to the driving shaft has a lug adapted to be engaged by a dog 11 to stop the shaft at the end of each revolution, said dog being released by a rod 12 attached to a foot lever (not shown).

Secured upon the countershaft is a cam wheel 13 having an internal cam groove 14 engaged by a roller 15 on the tail end of a rocker-bar 16 which is pivoted intermediate its ends upon a shaft 17 supported in bearing brackets secured upon the table 2 near its forward edge. This rocker-bar is formed with a guideway for a sliding push-bar 18 which is moved longitudinally therein by a roll 19 engaging an internal cam groove 20 in a cam wheel 21, said roll being carried by an extension 22 of the push-bar which is pivoted to said bar at one end and forked at its opposite end to embrace the shaft 5 and slide thereon. A post 23 is secured to the forward end of the push-bar and pivotally attached to the lower end of said post at their point of intersection, are the crossed levers 24, the forward ends of which are slotted inward from their inner adjacent edges forming a pocket to receive the wipers 25. These slots are semi-circular in form, their inner edge or bottom being curved and the inner edges 26 of the levers are similarly curved or cut away to prevent them from projecting too far over the wipers when said wipers are closed.

The wipers consist of two curved plates 27 pivotally attached at one end to a connecting plate 28, said plates all being provided with an inner formed edge to conform to the shape of the heel or toe of the shoe being lasted, and with an outer curved edge approximating the curve of the bottom of the slots in the levers. When closed, these wipers will closely conform to the shape of the toe or heel of the shoe regardless of its width, as the connecting plate 28 is adapted to engage and wipe the shoe at the extreme end or point of its heel or toe. Said wipers are loosely held within said slots by springs 29 secured to the ends of the levers and engaging at their free ends, notches in the ends of the wiper plates 27. The wipers are thus free to turn, shift or slide within their slots to adjust themselves to the heel or toe of the shoe being operated upon and may be quickly and easily detached if desired.

The levers 24 are pivotally attached to the lower end of the post 23 by a stem 30 on said post passing through said levers, a large washer 31 on the stem above said levers and a similar washer 32 below, engaging a shoulder on the stem, serving as guide bearings for said levers, and a nut on the lower screw-threaded end of the stem forces the lower washer against said shoulder and secures the levers and washers thereon. To take the heavy thrust of the wipers so that they will more readily adjust themselves in their slots and be more easily closed by the levers, a thrust pin 33 is secured to the washers at their forward side, said pin passing through notches in said levers in a position to be engaged by the rear edge of the connecting plate 28 of the wipers and forming a fixed stop therefor. The said plate is thus held by said pin from being forced into contact with the bottom of its slot, lessening friction and increasing the leverage of the operating levers to close the wipers.

The rearwardly extending ends of the levers 24 are connected by a plate 34 having forwardly converging slots 35 through which pins or rolls 36 on the levers extend and slide freely, and to this plate is secured the forward end of a bar 37 which extends rearwardly and slides freely through openings in ears 38 and 39 on the lower side of the rocker-bar. A coiled spring 40 is sleeved upon said bar 37 between the ear 38 and a collar 41 adjustably secured upon the bar, to normally hold said bar and the plate 34 moved rearwardly and thus, by reason of the inclination of the slots in said plate, to yieldingly hold the wipers in closed position. Said wipers are positively opened by providing an outside cam-surface 42 upon the wheel 21 which is engaged by a roll 43 carried by a bracket 44 adjustably secured upon the rear end of the bar 37. The spring 40 holds the roll 43 in contact with its cam and as the cam is turned, the bar and plate 34 are forced forward against the action of said spring, spreading the rear ends of the crossed levers apart and positively opening the wipers. The force with which the spring 40 will close the wipers upon the work is regulated by adjusting the collar 41, and the distance which the wipers will be closed may be changed by adjusting the bracket 44 along the bar 37.

The push-bar 18 with its post and pivotally attached levers carrying the wipers, and the wiper-control bar 37 are all carried by and rock with the rocker-bar 16 as is also a push-bar 45 which slides in a guideway provided therefor in the rocker-bar at one side of and parallel with the push-bar 18. On the rear end of the said bar 45 is a roll 46 engaging a second outside cam surface 47 on the wheel 21 and to its forward end is secured a vertical guide sleeve or bearing 48 for a vertically movable post 49 which is held from turning therein by a pin 50 extending through a slot in the sleeve. Said post is provided with a head 51 at its lower end formed with suitable bearings for the vertical stems 52 of the clamping fingers 53, which fingers project forwardly from the lower ends of said stems and when said head is lowered, are adapted to engage the upstanding edge of a shoe upper and clamp the same between them and the formed edges of the wiper plates, said fingers being curved to conform to the curve of said edges. The upper ends of the stems 52 are each provided with a rearwardly and laterally extending arm 54, which arms are normally held spread apart by springs 55 attached to the head, to normally hold said clamping fingers turned toward each other, or in closed position. The fingers are opened to spread the edge of the shoe upper outward over the edge of the wipers, by the engagement of the arms 54 with forwardly extending diverging plates 56 secured upon each side of the post 23 by bolts 57 passing loosely through openings in the plates and screwed into screw-threaded openings in the post, said plates being yieldingly held against the post by coiled springs 58 sleeved on said bolts, and being prevented from turning on the bolts by their engagement at their lower edges with the washer 31. The roll 46 is held in contact with its cam by a coiled spring 59 sleeved upon a rod 60 pivotally attached at one end to the forward end of the bar 45 and extended through a guide block 61 pivotally attached to the post 23, said spring being interposed between said block and suitable adjusting nuts on the free end of the rod. When the reduced side of said cam is turned opposite the roll, said spring 59 operates to slide the bar rearwardly carrying the head 51 toward the post 23 and bringing the arms 54 into contact with the inner sides of the inclined ends of the plates 56, thus turning the arms toward each other and spreading the clamping fingers. If the resistance offered by the work to the opening of the fingers is sufficient, the springs 58 will yield, permitting said plates to slide out on their bolts, and breakage of the parts will be prevented.

Figure 2:
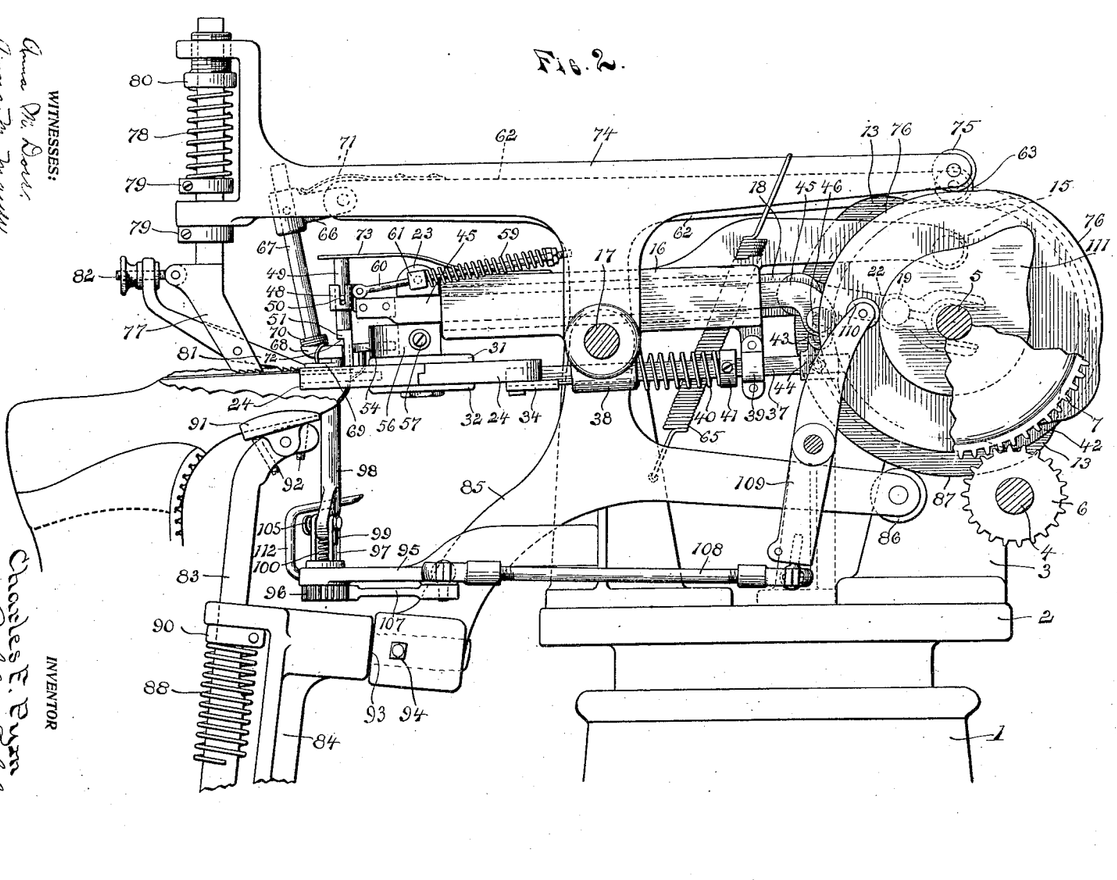
Fig. 2, a similar enlarged view of the machine with parts broken away to show the construction and with the mechanism in "second" position.
Figure 3:
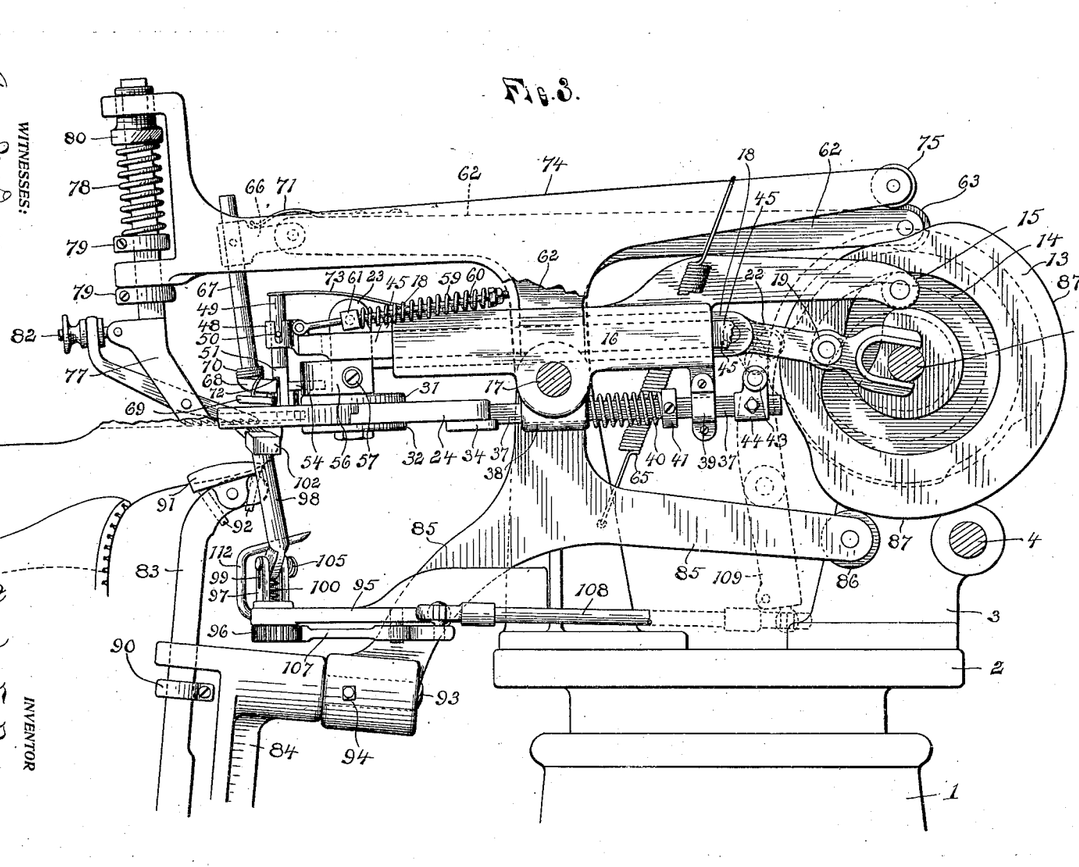
Fig. 3 is a like view with the parts in "third" position and with other parts broken away to further disclose the construction.
Figure 4:
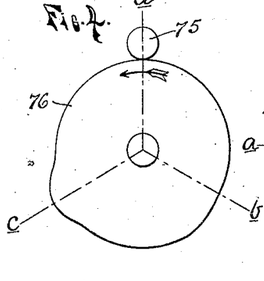
Fig. 4 is a diagram of the presser cam.
Figure 5:
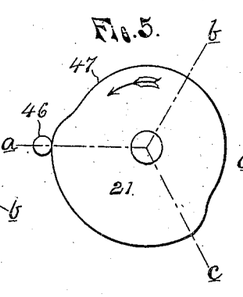
Figs. 5, 6, 7, 8, 9, 10, and 11 are similar views of the spreader cam, wiper-control cam, rocker cam, push cam, jack cam, insole cam, and wirer cam, respectively.
Figure 6:
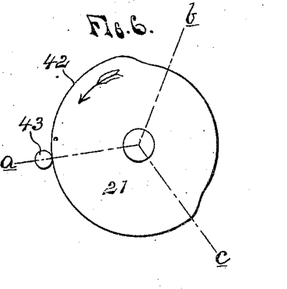

Pivoted intermediate its ends upon the shaft 17 is a rocker-bar 62 having a roll 63 on its rear end to engage an outside cam 64 on the cam shaft, a spring 65 being provided to hold the bar with its roll in contact with the cam, and pivotally attached to the forward end of said rocker-bar is a short arm 66 formed with a bearing sleeve within which a downwardly extending rod 67 is adjustably secured. Upon the lower end of said rod is a rearwardly extending head 68 to which two forwardly extending fingers 69 are pivotally attached and these fingers are curved to conform substantially to the outline of the heel or toe of a sole upon the last and are formed with vertical outer sides and slanting or cut-away inner sides to form a thin lower edge adapted to engage the sole along its edge outside its lip and hold said edge down upon the last against any possibility of its being wiped up or turned back by the wipers in the process of lasting. Springs 70 normally hold the fingers spread or in open position but they are closed to conform to the shape of the sole by engagement with the clamping fingers when the head is lowered, bringing said fingers into the plane of the clamping fingers, and then moved rearwardly. These sole engaging fingers thus automatically adjust themselves to the different sizes and shapes of heels and toes and engage the sole close to its edge to hold it firmly down upon the last while the shoe upper is being wiped up. A spring 71 secured to the forward end of the rocker-bar 62 exerts a force to normally hold the arm 66 turned and the head 68 on the rod 67 in engagement with the clamping head 51. Said clamping head is formed with a shoulder 72 at its rear side beneath which the head 68 engages and when said sole member is raised by the rocking of the bar 62, its head engages said shoulder and lifts the clamping member, and when the sole member is lowered, the clamping member falls also, a spring 73 being secured to the rocker 16 with its free end engaging the upper end of the post 49 to force said post downward through its socket and bring the clamping fingers into engagement with the work. The parts are so proportioned that the clamping fingers engage and clamp the shoe upper to the wipers before the sole member has finished its downward movement, and thus, as shown in Fig. 2, the head 68 leaves the shoulder 72, continuing downward after the head 51 is stopped by the engagement of its fingers with the work, so that upon the raising of the sole member or hold-down, its fingers will be lifted a short distance, enough to clear the lip of the sole before its head will engage and lift the clamping head.

A rocker-bar 74 is pivoted intermediate its ends upon the shaft 17 and is provided at its rear end with a roll 75 to engage an outside cam 76 on the cam shaft, a spring being attached to the bar to hold the roll in contact with its cam. At its forward end said rocker-bar is formed with guide bearings for a vertically extending bar having a presser foot 77 at its lower end provided with teeth to engage the sole of the shoe being lasted. A coiled spring 78 sleeved on the bar between said bearings yieldingly holds the foot downward and collars 79 above and below the lower bearing form stops to limit the movement of said bar in its bearings. A screw-threaded thimble 80 in the upper bearing engages the upper end of said coiled spring and may be turned to adjust it in said bearing and regulate the tension of the spring. Pivotally attached to said presser foot near its lower end is a presser-arm 81 extending rearwardly therefrom and formed with teeth to engage the shoe sole near the end of its toe or heel. A tail-piece on the presser-arm extends forwardly and upwardly from its pivot and a screw-threaded bolt 82 pivotally attached at one end to the presser-foot, passes through an opening in the upper end of the tail-piece and is provided with a thumb-nut to engage said tail-piece, so that by turning the nut the presser-arm is rocked upon its pivot to adjust its contact end relative to the contact end of the foot.

The shoe and last upon which the shoe to be lasted is secured, are held in position for lasting and firmly clamped against the presser-foot and presser-arm by a jack consisting of a post 83 mounted in guide bearings upon a casting 84 adjustably secured to the forward end of a rocker-bar 85 pivoted intermediate its ends upon the shaft 17 and provided at its rear end with a roll 86 to engage an outside cam surface 87 upon the cam wheel 13. The post 83 which is adapted to slide in its bearings, is yieldingly held in raised position by a coiled spring 88 sleeved thereon between an adjusting thimble 89 in the lower bearing and a collar 90 on the post below the upper bearing. The tension of the spring may be adjusted by the thimble and the collar forms a stop to limit the upward movement of the post 83 and determine the position of the supporting head or seat 91 for the last relative to the nippers, which seat is pivotally attached to the upper end of the bar. This seat is adapted to engage the last between its toe and instep portions, and it may be tilted forward or back upon the post to give the last the desired inclination, by set-screws 92 extending through screw-threaded openings in the post into engagement with the under side of the seat near its forward and rear ends. To provide for the adjustment of the seat laterally and forwardly and rearwardly relative to the presser foot and the wipers, the casting 84 is attached to the rocker-bar 85 by providing it with a stub shaft 93 to engage a socket on the end of said bar, a set-screw 94 being provided to hold the shaft in its socket and permit the same to be turned or adjusted longitudinally therein.

To automatically draw a wire around the toe of the last upon the laid over and formed down portion of the shoe-upper adjacent to its edge, a supporting bracket 95 is secured to a convenient stationary part of the machine with its forward end beneath the toe of the last when said last is clamped by the jack in position for lasting. The forward end of said bracket forms a bearing for a vertical stud to the lower end of which, beneath the bracket, a pinion 96 is secured and upon the upper end of which are the vertical ears 97 between which an upwardly extending arm 98 is pivoted by a bolt passing through vertical slots 99 in the ears. A spring 100 between said ears engaging the arm normally holds the same lifted with its pivot bolt in the upper ends of the slots. The upper end of the arm 98 is formed with a bore to receive a pin 101 on a suitable head 102 having a forwardly extending bill provided with a guide groove for the securing wire. In the bore beneath said pin is a coiled spring 103 to normally hold the head raised and in operation to force the bill up against the under side of the wipers so that the wire will be guided to place upon the wiped over edge of the upper. The head is prevented from turning upon the arm and limited in its lifting movement by any suitable means such as a small pin 104 in the pin 101 engaging a slot in the arm, and a spring 105 is provided to turn the arm 98 between said ears 97 and normally force the end of the guide bill into contact with the toe. Mounted upon an arm on the upper end of the arm 98 is a suitable tension device 106 for the wire.

The pinion 96 is rotated to turn the arm 98 by a sector 107 pivoted upon the bracket 95 and actuated in timed relation to the movement of the wipers and other parts of the machine by a connecting rod 108 attached thereto at one end and at its opposite end to the lower end of a lever 109 pivotally supported intermediate its ends and provided at its opposite end with a roll 110 engaging an outside cam 111 on the cam shaft. When said cam actuates the sector, said arm 98 is turned from a point at one side of and some distance from the end of the toe to a point at the opposite side of the toe adjacent to a tack driven into the sole to which tack the wire is to be secured, and the wire is thus guided to place completely about the toe. It is desirable, when the parts are in position to receive a last, that the wirer arm and its guide head be held out of the way so as not to interfere with the insertion of said last, and to so hold the arm, a finger 112 is secured to the bracket 95 in such a position and is so formed that when the arm is turned back after drawing the wire around the toe, said arm will engage beneath the end of said finger and by reason of the slanting projecting portion of said finger, said arm will be turned downward on its pivot, swinging its upper end outward away from the wipers and last.

In Figs. 4 to 11 inclusive, the several actuating arms are diagrammatically illustrated, showing their relation to each other when the rolls engaging the cams are in the positions indicated, by the dotted lines marked $a$, $b$ and $c$ or the three positions in which the machine is designed to be stopped by the dog 11 during each cycle of operation. When the parts are in the position shown in Fig. 1, the rolls are in the positions indicated by the lines $a$ and the parts are at rest with the jack lowered, the roll 86 being in contact with the small part of its cam; the wipers are in their lowered position, the roll 15 on the rocker-bar being in the concentric part of its cam groove; the push-bar carrying the wipers is in its rearmost position, the roll 19 being in the innermost part of its cam groove; the push-bar 45 is projected to its forward position against the action of the spring 59 by the engagement of its roll 46 with the large part of its cam, carrying the clamping head away from the plates 56 and permitting the clamping fingers to close; the rocker-bar 62 is rocked by the engagement of its roll 63 with the smallest portion of its cam, to raise the forward end of the bar to its highest position, thus raising the sole hold-down head and its fingers and by the engagement of said head with the shoulder on the clamping head, raising and holding the clamping head and its fingers away from the wipers; and the roll 75 on the presser-bar is in contact with the reduced side of its cam so that the presser-foot and presser-arm are raised. The parts are thus opened up to give free access in putting the shoe with its last in place with the edge of the upper projecting upward adjacent to the forming edge of the wipers.

When the operator starts the machine by actuating the dog 11 to release the wheel 10 and permit the clutch to operate, the push-bar 45 is at once moved rearwardly by its spring 59, bringing the arms on the clamping fingers 53 into contact with the plates 56 and gradually spreading said fingers within the upstanding edge of the shoe upper as said fingers are moved rearwardly toward said edge. The roll 63 on the rocker-bar of the insole-control mechanism then engages an increased portion of its cam, rocking said bar and lowering the head 68 which in turn permits the spring 73 to lower the clamping head and bring its fingers into contact with the edge of the shoe upper to clamp the same down upon the formed edge of the wipers, said insole member continuing by reason of the increasing diameter of the cam, to lower to more and more firmly engage the edge of the sole. As soon as the edge of the shoe upper is clamped, the jack is raised by the engagement of the roll 86 with the large portion of its cam and the last is firmly clamped between it and the presser-foot and presser-arm, and the reduced portion of the cam 42 then comes opposite the roll 43, permitting the spring 40 to move the plate 34 rearwardly, closing the wipers upon the heel or toe of the shoe with a yielding pressure. These movements have taken place during one rotation of the power shaft and when stopped by the dog 11, the parts are in the position shown in Fig. 2 with the cam rolls in position $b$.

While the machine is at rest in position $b$, the operator fastens the securing wire to a tack driven into the shoe sole. The machine is then again started and during this rotation of the power shaft and the turning of the cams from position $b$ to $c$, the wipers are rocked to their uppermost position by the cam 14 and then lowered to their lowest position, at the same time being gradually moved forward by the cam 20 to the limit of their forward movement. While gripping the heel or toe, the wipers are thus raised, wiping the leather and by reason of being clamped to the edge of the wipers it is also stretched to eliminate all wrinkles. The forward movement assists in the wiping and when the wipers are raised above the sole, it projects them thereover, said wipers at the same time being automatically closed by said spring 40. When the wipers are raised above the shoe sole and start to project over the edge of the same, a slight reduction in the cam 64 permits the rocker-bar to rock and raise the sole fingers 69 sufficiently so that they will not strike and injure the lip of the insole, this upward movement taking place without raising the clamping fingers, owing to the previous lowering of the head 68 out of contact with the shoulder on the head 51. From this point the cam 64 is gradually reduced so that the insole control, embodying the head 68, will continue to raise and by the contact of said head with said shoulder of the clamping head, raise the clamping fingers. During the early part of the turning of the cams from position $b$ to $c$, the presser-foot is forced downward slightly by its cam 76 to more firmly clamp the last, and at the end of this movement, a projection on said cam forces the presser-foot still farther downward, compressing the spring 88 of the jack slightly, and relieving the pressure between the edge of the wipers and the last to permit the securing wire to be drawn beneath said edge of the wipers to hold the laid-over edge of the upper in place. The cam 111 operates just as the pressure between the wipers and last is relieved, to turn the wirer quickly around the toe and lay the wire in place, said wirer arm being held in the position to which it is turned by the stopping of the machine in position $c$ and the operator is thus given time to secure the wire to a tack in the sole before the last is released from the machine. Just as position $c$ is reached, the push-bar 45 is moved forward by its cam to carry the clamping fingers forward and permit them to close, and the bar 35 is thrust forward by the cam 42 moving the plate 34 forward and positively opening the wipers.

Figure 1:
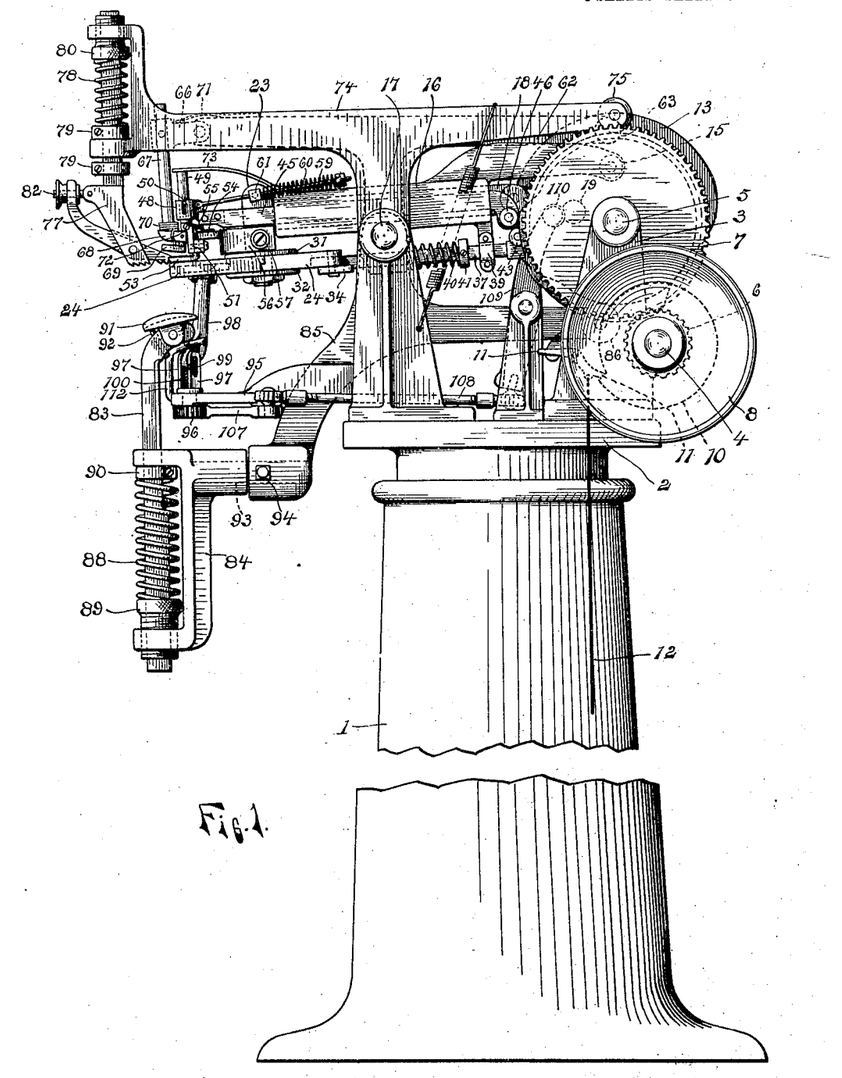
Figure 1 is a side elevation of a machine embodying the invention and showing the parts in "first or open position"

During the turning of the cams from position $c$ to $a$ the parts are returned to the position shown in Fig. 1 or open position, thus releasing the lasted shoe and the cycle of operation is completed with the parts in position to receive another last.

Figures 7, 8, 9, 10, 11, 12, 13:
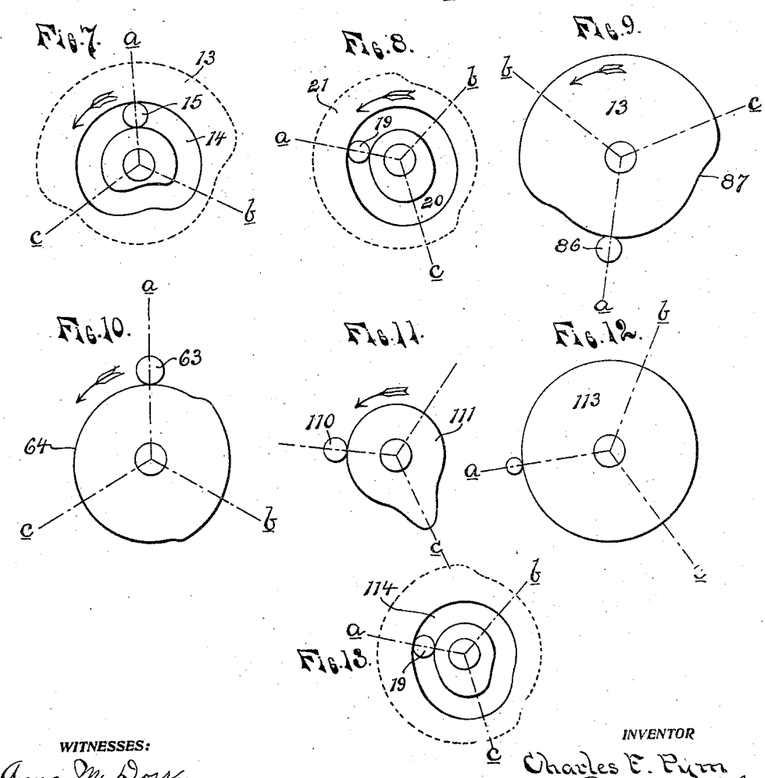
Fig. 12 is a diagram showing a wiper-control wheel to be substituted for the cam shown in Fig. 6, when the machine is used in the manufacture of "turned" shoes.
Fig. 13 is a similar view of a substitute push cam to be used when the wheel shown in Fig. 12 is used.
Figure 12:
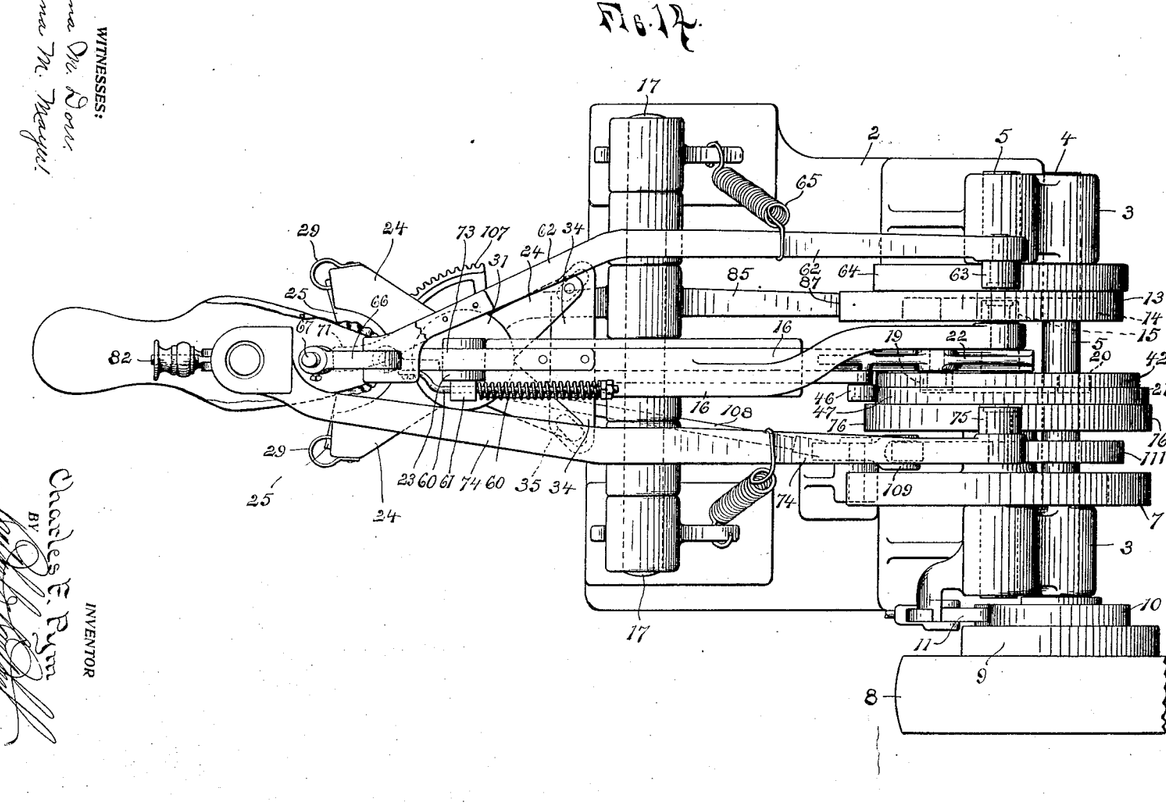
Figure 15:
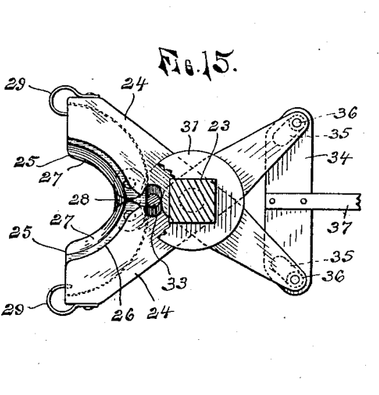
Fig. 15 is a detail showing the wipers and their operating levers in plan view and in open position.
Figure 16:
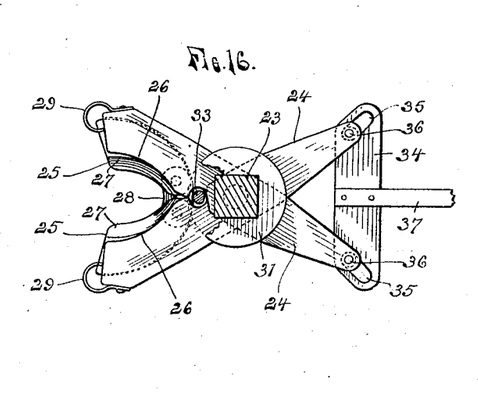
Fig. 16, a similar view showing the wipers in closed position.
Figures 17, 18:
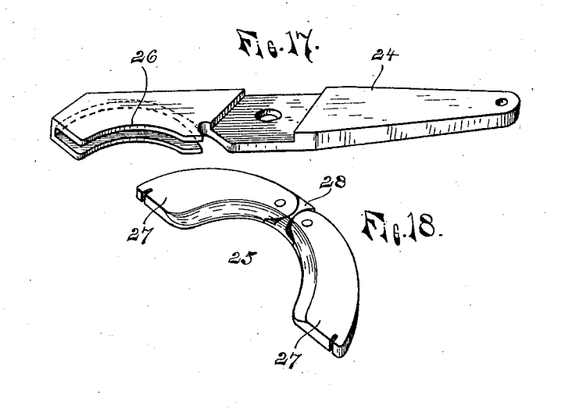
Fig. 17 is a perspective view of one of said operating levers.
Fig. 18 is a similar view of the wipers, detached.
Figure 19:
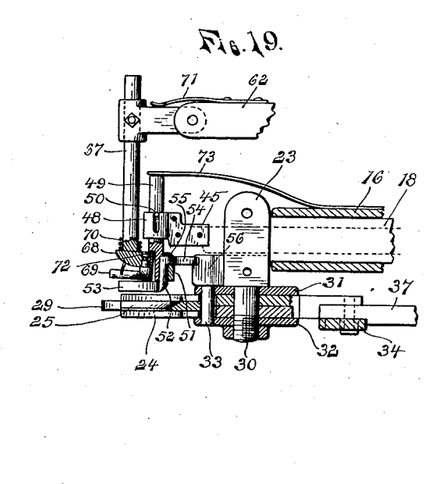
Fig. 19 is a detail showing in section the wipers and adjacent parts and the clamping and insole members, said members being in "first" position.
Figure 20:
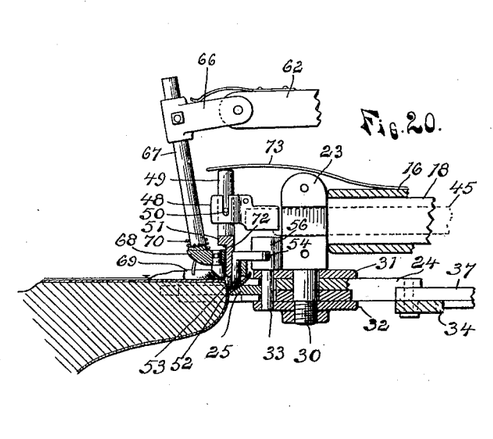
Figs. 20 and 21 are like details showing the parts in "second" and "third" positions, respectively.
Figure 21:
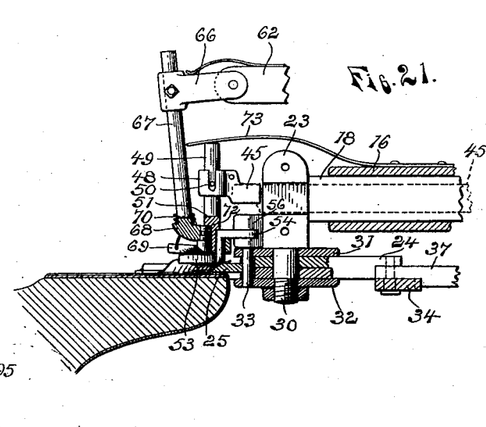
Figure 22:
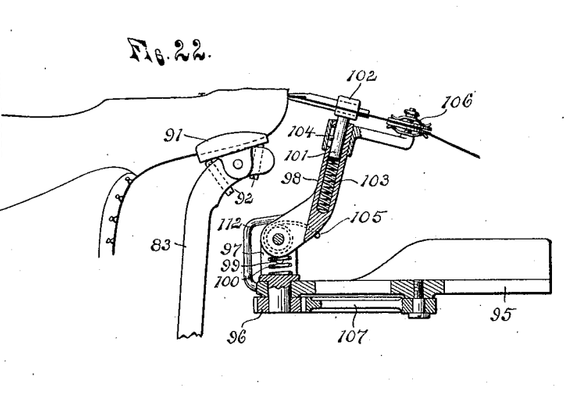
Fig. 22 is a sectional detail of the wirer.
Figures 23, 24, 25:
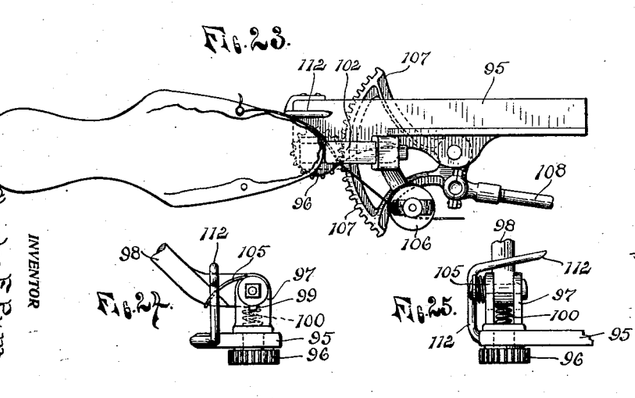
Fig. 23, a plan view of the same.
Figs. 24 and 25 are details showing the hold-down finger of the wirer in end and side elevation, respectively.
Figure 26:
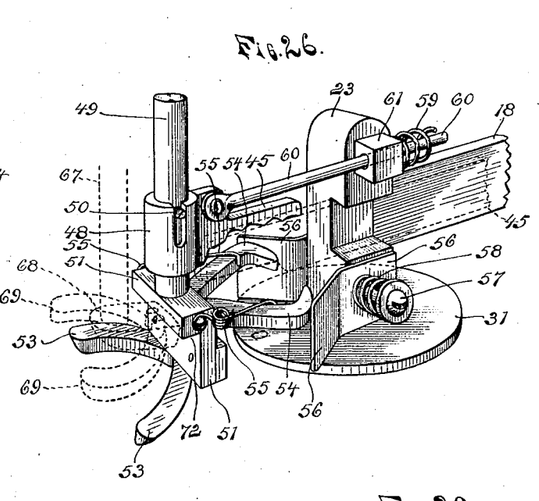
Fig. 26 is an enlarged perspective view of the clamping mechanism and adjacent parts.
Figures 27, 28:
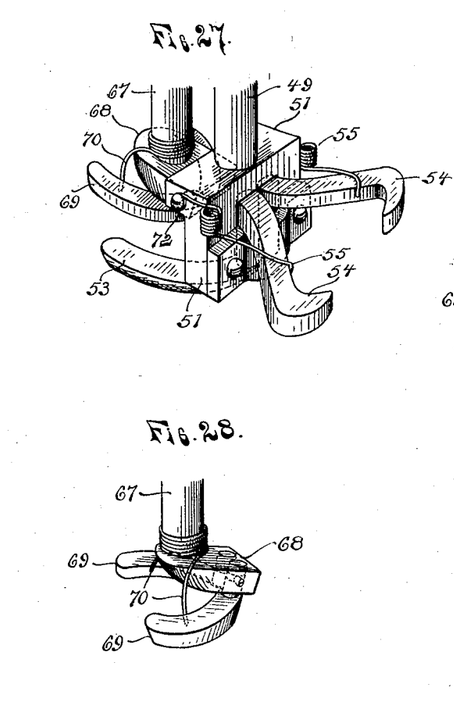
Fig. 27, a similar view of the same looking at the rear side thereof and showing the insole fingers.
Fig. 28 is a perspective detail of the insole fingers and carrying head.
Figure 29:
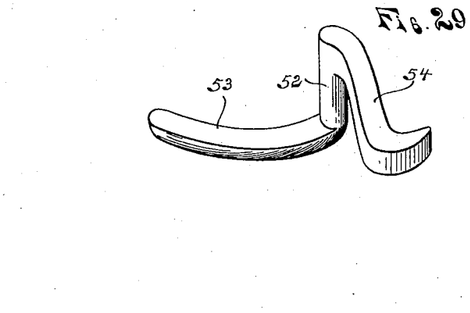
Fig. 29 is an enlarged, perspective view of one of the clamping fingers detached.

When the machine is being used upon "turned" work, the wheel 113 shown in Fig. 12 is substituted for the cam wheel 21 and the cam 114 shown in Fig. 13 for the cam 20 so that the push-bar 45 will be held from being moved rearwardly by its spring to close the wipers upon the heel or toe of the shoe and said wipers will remain open until the push cam moves the push-bar forward, which movement will close the wipers over the sole, and thus the wipers are prevented from engaging the projecting edge of the sole of the "turned" shoe and wiping it up.

Having thus fully described my invention what I claim is:

1. In a machine of the character described, wipers adapted to embrace the heel or toe of a shoe, power means for moving said wipers, and means for automatically closing the wipers in timed relation to their other movement and independent thereof.

2. In a machine of the character described, means for supporting a last, wipers adapted to engage the heel or toe of a boot or shoe upon the last, means for changing the relative positions of the last-support and wipers, means for imparting a reciprocating movement to the wipers to project the same over the sole of the boot or shoe, and means operating independently of and in timed relation to the movement of the reciprocating means to cause the wipers to close upon the heel or toe below the sole and wipe the upper up and over the edge of the sole.

3. In a lasting machine, wipers, means for imparting a reciprocating movement to said wipers, means for opening and closing said wipers independently of the reciprocating means, and power driven means for actuating said reciprocating means and said opening and closing means to cause said wipers to automatically open and close and to reciprocate in timed relation.

4. In a machine of the character described, wipers adapted to embrace the heel or toe of a boot or shoe, yielding means to yieldingly hold the said wipers closed upon the heel or toe during the process of lasting, and means for positively opening said wipers against the action of said yielding means.

5. In a machine of the character described, wipers adapted to embrace the heel or toe of a boot or shoe, means for automatically moving said wipers, a spring to close said wipers upon the heel or toe and yieldingly hold the same in closed position, and means operating in timed relation to the means for moving said wipers to control the operation of said spring.

6. In a machine of the character described, wipers adapted to embrace the heel or toe of a boot or shoe, means for automatically moving said wipers, a spring to close the wipers upon the heel or toe and yieldingly hold the same closed upon the work during the lasting operation, and means operating in timed relation to the means for moving the wiper, to permit the spring to close said wipers and operating to positively open said wipers against the action of said spring.

7. In a machine of the character described, wipers adapted to engage the heel or toe of a shoe, means for automatically moving said wipers, means operating independently of said means and in timed relation thereto for opening the wipers, and means for yieldingly closing the wipers.

8. In a machine of the character described, means for laying over the edge of an upper upon a last in the process of lasting, a clamping member to hold the said edge, a sole-member to engage a shoe sole along its edge adjacent to said clamping member and adapted to engage and lift said clamping member, and means operating in timed relation to the movement of the laying-over means to lift said sole-member into engagement with the clamping member and to lift said clamping member therewith.

9. In a machine of the character described, means for laying over the edge of an upper upon a last in the process of lasting, a vertically movable clamping member, a spring to move said member into clamping position, a sole-member adapted to engage a shoe sole along its edge and projecting beneath a shoulder upon the clamping-member, and means operating in timed relation to the movement of the laying-over means for moving said sole-member to raise the same out of the path of the laying-over means and into engagement with the shoulder on the clamping member to raise said member out of clamping position.

10. In a machine of the character described, means for laying over the edge of the upper upon a last in the process of lasting, pivoted fingers to engage the shoe sole at its edge and hold the same down upon the last, and means for automatically moving said fingers into and out of engagement with the sole in timed relation to the movement of the laying-over means.

11. In a machine of the character described, wipers, means for projecting said wipers over the edge of a shoe sole in the process of lasting, a sole-member having movable curved fingers to engage a shoe sole along its edge, means for normally holding said fingers in extended position, and means for automatically raising and lowering said fingers in timed relation to the movement of the wipers.

12. In a machine of the character described, pivotally connected wiper plates having curved outer edges, levers for actuating said plates each formed with a pocket to receive the said curved outer edges of the plates said plates being adapted to be adjusted in said pockets by the engagement of the work therewith, and means for actuating said levers.

13. In a machine of the character described, pivotally connected wiper plates, crossed levers pivoted together at their intersection and having slots in their adjacent edges at one end forming a pocket to receive the outer edges of the plates, which plates are adapted to be adjusted by the engagement of the work therewith, said edges being curved and the bottom of said slots being correspondingly curved, and means for actuating said levers.

14. In a machine of the character described, pivotally connected wiper plates, means for actuating said plates permitting a free movement of the pates independently of said actuating means, and means for preventing the rearward movement of the pivotally connected ends of the plates relative to said actuating means.

15. In a machine of the character described, pivotally connected wiper plates, means for actuating said wipers to close the same upon the work, and a fixed stop to engage the outer side of said wipers near their connecting pivot and prevent the rearward movement of the pivotally connected ends of said plates relative to the actuating means.

16. In a machine of the character described, pivotally connected freely movable wiper plates adapted to be moved by the engagement of the work therewith, means for carrying and actuating said wiper plates permitting a free movement of said plates thereon and engaging each plate near its free end to turn said plates upon their pivoted connection, and a stop carried independently of the actuating means to engage said wipers near their pivotal connection.

17. In a machine of the character described, pivotally connected wiper plates, crossed levers formed at one end with pockets to receive the outer edges of the plates within which pockets said plates are adapted to be freely adjusted by the engagement of the work therewith, means for actuating the levers to open and close the wipers, and a fixed stop engaging the rear edge of said plates near their pivotal connection.

18. In a machine of the character described, wiper plates, crossed levers for actuating said plates formed with slots to receive the outer edges of the plates and means for yieldingly holding said plates in said slots and permitting the same to be moved freely therein by the engagement of the work therewith.

19. In a machine of the character described, pivotally connected wiper plates, crossed levers pivoted together at their intersection and having slots in their adjacent edges at one end to receive the outer edges of the plates, and means for retaining said plates in said slots and permitting the same to slide longitudinally therein to adjust themselves to the work.

20. In a machine of the character described, pivoted wiper-plates, means for actuating said wipers, crossed levers to open and close said plates, a push-bar, means connecting said bar and the ends of said levers to actuate the levers, and power actuating means to engage and move said bar in timed relation to the means for actuating said wipers.

21. In a machine of the character described, pivoted wipers and means for raising and lowering the same, crossed levers engaging the wipers at one end to open and close said wipers, means connecting the other ends of said levers to actuate the same, a push-bar attached to said connecting means, and a cam to move said bar in timed relation to the raising and lowering movement of the wipers.

22. In a machine of the character described, wipers having formed edges to engage the heel or toe of a shoe, clamping fingers each having a pivot stem at one end, an arm on each stem, means to engage the arms to turn the fingers in one direction, and springs to turn said fingers in the opposite direction.

23. In a machine of the character described, wipers having formed edges to engage the heel or toe of a shoe, means for actuating said wipers, clamping means to engage the edge of the shoe upper, means for reciprocating said clamping means independently of the wipers and in timed relation thereto, and separate means for raising and lowering said clamping means relative to the wipers in timed relation thereto and in timed relation to the reciprocating movement.

24. In a machine of the character described, wipers having formed edges to engage the heel or toe of a shoe, means for actuating said wipers, clamping means to engage the edge of a shoe upper, means for reciprocating the clamping means independently of and in timed relation to the wipers, separate means for engaging a shoe sole along its edge, and means for simultaneously raising said sole engaging means and said clamping means in timed relation to the reciprocating movement.

25. In a machine of the character described, pivotally connected wiper-plates and means for clamping the edge of a shoe upper to the edge of the wiper-plates consisting of a reciprocable bar having a bearing at one end, a post slidable in said bearing, a head on the lower end of the post, a spring to normally hold the post lowered, curved clamping fingers pivotally attached to the head, and means for raising the post in its bearing against the action of said spring.

26. In a machine of the character described, in combination with means for laying-over the edge of an upper of a boot or shoe upon a last in the process of lasting, of means movable about the heel or toe of said boot or shoe upon said last in contact therewith to guide a wire into engagement with the laid-over edge of the upper, and means for actuating said means.

27. In a machine of the character described, in combination with means for laying over the edge of the upper of a boot or shoe upon a last in the process of lasting, of a wire guide, and means for moving said guide around the heel or toe of said boot or shoe and causing the same to substantially follow the outline of said heel or toe.

28. In a machine of the character described, in combination with means for laying over the edge of the upper of a boot or shoe upon a last in the process of lasting, of a guide arm, means for actuating said arm to carry a wire about the heel or toe of the shoe, and means for causing said arm to substantially follow the outline of the heel or toe to guide the wire to place.

29. In a machine of the character described, in combination with means for laying over the edge of the upper of a boot or shoe upon a last in the process of lasting, of an oscillatory guide, means for causing said guide to substantially follow the outline of the shoe heel or toe, and means for oscillating said guide.

30. In a machine of the character described, in combination with means for laying over the edge of the upper of a boot or shoe upon a last in the process of lasting, of an oscillatory arm having means for guiding a wire, means for operating the arm to cause its wire guide to substantially follow the outline of the heel or toe, and means for oscillating said arm.

31. In a machine of the character described, in combination with means for laying over the edge of the upper of a boot or shoe upon a last in the process of lasting, of a wire guide, means for holding said guide in contact with the shoe heel or toe, and means for moving said guide about the same.

32. In a machine of the character described, in combination with means for laying over the edge of the upper of a boot or shoe upon a last in the process of lasting, of a guide, means for normally holding said guide in engagement with the shoe heel or toe, and means for turning said guide.

33. In a machine of the character described, in combination with means for laying over the edge of the upper of a boot or shoe upon a last in the process of lasting, of a guide arm pivoted to swing to substantially follow the outline of the shoe heel or toe, and means for turning said arm to move the same around said heel or toe.

34. In a machine of the character described, the combination with means for laying over the edge of a shoe upper upon a last in the process of lasting, of an arm supported at one end to turn with its opposite end adjacent to and following substantially the outline of said heel or toe to guide a wire around the same, and means for turning said arm.

35. In a machine of the character described, in combination with means for laying over the edge of the upper of a boot or shoe upon a last in the process of lasting, of an oscillatory guide arm having a guide for a wire at one end and pivoted near its opposite end to swing as it is oscillated and permit its guide end to substantially follow the outline of the shoe toe or heel, and means for oscillating said arm.

36. In a machine of the character described, in combination with means for laying over the edge of the upper of a boot or shoe upon a last in the process of lasting, of a guide arm turnable upon a vertical axis and pivoted to turn upon a horizontal axis, means for turning said arm upon its horizontal axis to bring its guide end adjacent to the shoe heel or toe and means for turning said arm upon its vertical axis.

37. In a machine of the character described, in combination with means for laying over the edge of the upper of a boot or shoe upon a last in the process of lasting, of a pivoted guide member, means for permitting said member to move toward and from the shoe heel or toe, means for yieldingly holding said arm against said heel or toe, and means for turning said member.

38. In a machine of the character described, the combination with means for laying over the edge of a shoe upper upon a last in the process of lasting, of an arm mounted to turn upon a vertical axis and pivoted to turn upon a horizontal axis near its lower end, means for yieldingly holding said arm turned upon its horizontal axis with its upper end engaging the shoe heel or toe, and means for turning said arm upon its vertical axis in timed relation to the movement of the laying-over means.

39. In a machine of the character described, the combination with means for laying-over the edge of a shoe upper upon a last in the process of lasting, of a support having a bearing below the plane of the heel or toe of the shoe being lasted, a stud in said bearing, an arm pivoted to said stud, a wire guide upon the upper end of said arm, a spring to normally hold said arm with its guide engaging the shoe heel or toe, and means for turning said stud to actuate the arm in timed relation to the movement of the laying-over means.

40. In a machine of the character described, the combination with means for laying-over the edge of a shoe upper upon a last in the process of lasting, of an inclined member, means for carrying said member around the shoe heel or toe with its guide end adjacent to said heel or toe and for maintaining such inclination of said member relative to the shoe, and means for actuating said carrying means.

In testimony whereof I affix my signature in presence of two witnesses.

CHARLES F. PYM.

Witnesses:
LEWIS E. FLANDERS,
OTTO F. BARTHEL.